United States Patent
Toksvig

(10) Patent No.: US 7,619,635 B1
(45) Date of Patent: Nov. 17, 2009

(54) ANISOTROPIC TEXTURE SAMPLING FOR ODD RATIOS

(75) Inventor: Michael J. M. Toksvig, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 376 days.

(21) Appl. No.: 11/225,515

(22) Filed: Sep. 13, 2005

(51) Int. Cl.
G09G 5/00 (2006.01)
(52) U.S. Cl. .................. 345/582; 345/587; 345/611
(58) Field of Classification Search .............. 345/582, 345/587, 611
See application file for complete search history.

(56) References Cited

U.S. PATENT DOCUMENTS

| | | | |
|---|---|---|---|
| 5,528,003 | A | 6/1996 | Bodin et al. |
| 6,040,837 | A | 3/2000 | Wong et al. |
| 6,252,698 | B1 | 6/2001 | Oikawa |
| 6,292,193 | B1 | 9/2001 | Perry et al. |
| 6,525,740 | B1 | 2/2003 | Cosman |
| 6,664,971 | B1 | 12/2003 | Mukherjee et al. |
| 6,707,458 | B1 | 3/2004 | Leather et al. |
| 6,724,395 | B1 * | 4/2004 | Treichler ............... 345/582 |
| 6,850,243 | B1 | 2/2005 | Kilgariff et al. |
| 6,919,904 | B1 | 7/2005 | Kilgariff |
| 6,947,054 | B2 * | 9/2005 | Spangler ............... 345/582 |
| 7,071,937 | B1 | 7/2006 | Collodi |
| 7,221,371 | B2 * | 5/2007 | Donovan et al. ........ 345/582 |
| 7,271,810 | B1 * | 9/2007 | Newhall et al. ......... 345/582 |
| 7,339,594 | B1 * | 3/2008 | Newhall et al. ......... 345/582 |
| 2002/0126133 | A1 | 9/2002 | Ewins |
| 2005/0219256 | A1 * | 10/2005 | Donovan et al. ........ 345/586 |

OTHER PUBLICATIONS

Baoquan Chen et al., "Footprint Area Sampled Texturing", IEEE Transactions on Visualization and Computer Graphics, vol. 10 No. 2, Mar./Apr. 2004, pp. 230-240.
Ritter, Jack. "A Fast Approximation to 3D Euclidian Distance," *Graphics Gems* edited by Andrew S. Glassner, pp. 432-433, Academic Press, Inc. 1990.
Ohashi, Yoshikazu, "Fast Linear Approximations of Euclidian Distance in Higher Dimensions," *Graphics Gems IV*, edited by Paul S. Heckbert, pp. 120-124, Academic Press, Inc. 1994.
Barkans, Anthony C., "High Quality Rendering Using the Talisman Architecture," SIGGRAPH/Eurographics Workshop, 1997.
"Anisotropic Texture Filtering," Meltdown Feb. 1998 Prerelease, Direct3D Reference Rasterizer, Feb. 1998.

(Continued)

*Primary Examiner*—Jin-Cheng Wang
(74) *Attorney, Agent, or Firm*—Patterson & Sheridan, LLP

(57) ABSTRACT

Systems and methods for positioning bilinear texture samples to produce an anisotropically filtered texture mapped pixel may improve texture mapping performance and image quality. The bilinear texture samples are positioned along a major axis of anisotropy to approximate an elliptical footprint, ensuring that the bilinear texture samples span the entire axis of anisotropy without extending beyond the major axis of anisotropy. An additional bilinear texture sample or a pair of additional bilinear texture samples is positioned in the center of the axis of anisotropy dependent on the anisotropic ratio. The additional bilinear texture samples are weighed less than the other bilinear texture samples and all of the bilinear textures samples lie within the anisotropic footprint.

19 Claims, 12 Drawing Sheets

OTHER PUBLICATIONS

Talisman 3D Technology Briefing, Talisman Graphics & Multimedia System, Jan. 1996.

McCormack, Joe, et al., "Feline: Fast Elliptical Lines for Anisotropic Texture Mapping," Mitsubishi Electric Information Technology Center America, 2000.

Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.

Williams, Lance, "Pyramidal Parametrics," Computer Graphics, vol. 17, No. 3, Jul. 1983.

Heckbert, Paul S., "Fundamentals of Texture Mapping and Image Warping," *Master's Thesis*, Dept. of Electrical Engineering and Computer Science, University of California, Berkeley, CA, Jun. 17, 1989.

"ATI's Optimized Texture Filtering Called Into Question," Tom's Hardware Guide, Dec. 17, 2004. <http://www20.graphics.tomshardware.com/graphic/20040603/index.html>.

Heckbert, Paul, "Texture Mapping Polygons in Perspective," Computer Graphics Lab, New York Institute of Technology, Technical Memo No. 13, Apr. 28, 1983.

* cited by examiner

ANISOTROPIC TEXTURE SAMPLING FOR ODD RATIOS

BACKGROUND OF THE INVENTION

1. Field of the Invention

Embodiments of the present invention generally relate to computer graphics, and more particularly to anisotropic filtering of texture data.

2. Description of the Related Art

Conventional graphics processors are exemplified by systems and methods developed to read and filter texture map samples. To simplify the texture map filtering performed within a graphics processor, a texture is prefiltered and various resolutions forming an image pyramid or "mipmap stack" are stored. FIG. 1A is a conceptual diagram of prior art showing the levels of a mipmapped texture including the finest level, level 101, and successively lower resolution levels, 102, 103, and 104.

The region in texture space corresponding to a pixel is called the pixel's "footprint". A pixel can be approximated with a circle in screen space. For texture mapping of two-dimensional textures, the corresponding footprint in texture space can be approximated by an ellipse. In classic use of mipmaps, a mipmap level is chosen so that the footprint when scaled to that level is about 1 texel (texture pixel) in diameter. Then a bilinear filter is used to interpolate between the values of four texels forming a 2×2 square around the footprint center, to produce a bilinear texture sample. This is called isotropic filtering, because it filters equally in the two texture space dimensions, u and v. Although the filter yielding excellent image quality, the ideal filter, has an approximately elliptical shape, isotropic filtering approximates the ellipse with a circle that is too large, to simplify the texture sampling and filtering computations. Therefore, portions of the texture that are outside of the footprint are sampled, resulting in visual artifacts, such as blurring, caused by oversampling.

In FIG. 1A, a footprint 115 is a pixel footprint in texture space, with a position 135 being the footprint center. FIG. 1B illustrates a prior art application of texture level 101 applied to pixels of a surface 140 that is receding in image space. When viewed in image space, footprint 115 (an ellipse) appears as circle 116. All ellipses have a largest diameter, called the major axis, and a smallest diameter, called the minor axis. Isotropic filtering yields high quality images for pixels whose footprints have major and minor texture axes that are similar in length. But texture stretching, oblique viewing, and perspective can cause footprints to be very elongated, such as footprint 115. When isotropic filtering is used in such situations, a circle is not a good approximation of an ellipse. If the circle is too small (diameter close to the minor axis), the filter is too sharp, too few texels are averaged, and aliasing results. If the circle is too large (diameter close to the major axis), the filter is too broad, too many texels are averaged, and blurring results. Anisotropic texture filtering addresses this problem by using a filter that more closely matches the elliptical shape of the ideal filter.

FIG. 1C illustrates footprint 115 including a minor axis 125 that is significantly shorter than a major axis 130. Texture samples along major axis 130, the axis of anisotropy, are read from one or more mipmap levels and are blended to produce a pixel color. The level from which the samples are read is determined using a level of detail (LOD) value which is nominally the log base 2 of the length of minor axis 125. The number of texture samples read from the texture map is determined based on the ratio of the major axis to the minor axis, the anisotropic ratio, with more texture samples needed as the ratio increases, i.e. as the ellipse becomes more elongated.

FIG. 1D illustrates four bilinear texture samples, bilinear samples 140, bilinear sample 142, and bilinear sample 144 that are positioned along major axis 130 to approximate an elliptical footprint, such as footprint 115. Each bilinear sample corresponds to an isotropically filtered texture sample for an LOD of a texture map that is computed using conventional bilinear isotropic filtering. Bilinear samples from one or more LODs of a texture map are filtered to produce an anisotropically filtered texture sample corresponding to pixel 116. When the anisotropic ratio of the footprint is greater than two and not divisible by two, additional bilinear samples are positioned at opposing ends of the major axis. For example, bilinear samples 142 and 144 are positioned at opposing ends of footprint 115 (having an anisotropic ratio that is greater than two and less than four), adjacent to bilinear samples 140. The additional bilinear samples oftentimes extend beyond the major axis, e.g., bilinear samples 142 and 144 extend beyond major axis 130, and therefore include texture samples which lie outside of the elliptical footprint, possibly resulting in visual artifacts such as blurring. The number of bilinear samples and spacing of the bilinear samples should be determined such that all of the bilinear samples lie within the elliptical footprint.

Accordingly, there is a need to position bilinear texture samples within the elliptical footprint when performing anisotropic texture mapping for anisotropic ratios that are not divisible by two.

SUMMARY OF THE INVENTION

The current invention involves new systems and methods for determining the number and position of bilinear texture samples to use to produce an anisotropically filtered texture mapped pixel. The bilinear texture samples are positioned along a major axis of anisotropy to approximate an elliptical footprint, ensuring that the bilinear texture samples span the entire axis of anisotropy without extending beyond the major axis of anisotropy. When the anisotropic ratio is greater than an even number and less than or equal to an odd number, an additional bilinear texture sample is positioned in the center of the axis of anisotropy. When the anisotropic ratio is greater than an odd number and less than or equal to an even number, a pair of additional bilinear texture samples is positioned with a bilinear texture sample on either side of the center of the axis of anisotropy. The additional bilinear texture samples are weighed less than the other bilinear texture samples and all of the bilinear textures samples lay within the anisotropic footprint.

Various embodiments of a method of the invention for positioning bilinear texture samples along a major axis of anisotropy with a length greater than two, including positioning a single bilinear texture sample in a center of the major axis of anisotropy when the length of the major axis is greater than an even number and less than or equal to an odd number, computing a weight for the single bilinear texture sample that is less than a reciprocal of an anisotropic ratio of a footprint defined by the major axis of anisotropy, positioning remaining bilinear texture samples along the major axis of anisotropy to cover the length of the major axis of anisotropy, and computing a weight for each of the remaining samples that is the reciprocal of the anisotropic ratio of the footprint defined by the major axis of anisotropy.

Various embodiments of a method of the invention for computing positions and weights for bilinear texture samples on a major axis of anisotropy, including computing a step and a fraction, positioning a bilinear texture sample on the major axis of anisotropy offset from a center of the axis of anisotropy by the fraction multiplied by the length of the major axis of anisotropy, updating the fraction by subtracting step from the fraction, and repeating the positioning and updating until the fraction is not greater than half of the step. The step is computed as a reciprocal of a ratio of the major axis of anisotropy to a minor axis of anisotropy for a footprint. The fraction is computed as half of a difference between one and the step.

Various embodiments of the invention include a texture unit for performing anisotropic texture mapping to produce filtered texture values. The texture unit includes a bilinear position computation unit and a bilinear weight computation unit. The bilinear position computation unit is configured to position a single bilinear texture sample in a center of a major axis of anisotropy when a length of the major axis is greater than an even number and less than or equal to an odd number and configured to position remaining bilinear texture samples along the major axis of anisotropy to cover the length of the major axis of anisotropy. The bilinear weight computation unit is configured to compute a weight for the single bilinear texture sample that is less than a reciprocal of an anisotropic ratio of a footprint defined by the major axis of anisotropy.

Various embodiments of the invention include a programmable graphics processor for generating images using anisotropically filtered texture samples.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The major and minor axes of anisotropy define a footprint that represents the projection of the pixel onto the texture map. Bilinear texture samples are positioned along the axis of anisotropy (the major axis) to approximate the footprint. The number of bilinear texture samples determines the number of texture samples which are read from an LOD of a texture map and filtered to produce an anisotropically filtered texture value. The number of bilinear texture samples may be reduced to improve performance of anisotropic texture mapping. However, to maintain an acceptable level of image quality, the bilinear texture samples should be positioned to cover the major axis, without extending beyond the major axis.

Conventionally, an even number of bilinear texture samples are positioned along the major axis, even when an odd number of bilinear texture samples would cover the major axis. Furthermore, when the anisotropic ratio is not divisible by two, an additional bilinear texture sample is inserted at each end of the major axis, extending beyond the major axis. In contrast, the system and method of the present invention inserts either a single bilinear texture sample or a pair of additional bilinear texture samples, depending on the anisotropic ratio, in the center of the major axis. Therefore, all of the bilinear texture samples lie within the anisotropic footprint, resulting in a higher quality image and requiring fewer bilinear texture samples for anisotropic ratios that are greater than an even number and less than or equal to an odd number.

Figure 2A:
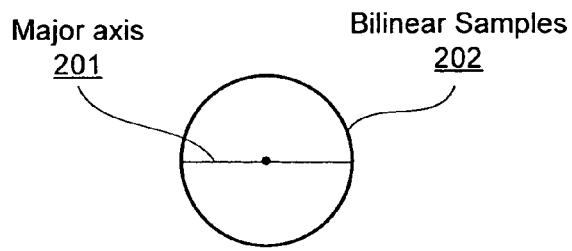
FIGS. 2A, 2B, 2C, 2D, 2E, 2F, 2G, and 2H are diagrams of positioning bilinear samples along a major axis to approximate an anisotropic footprint in accordance with one or more aspects of the present invention.

FIG. 2A is a diagram of positioning bilinear texture samples, bilinear samples 202, along a major axis 201 to approximate an anisotropic footprint in accordance with one or more aspects of the present invention. The anisotropic ratio corresponding to major axis 201 is slightly greater than one, i.e. the footprint is nearly isotropic. When the anisotropic ratio is greater than an odd number and less than or equal to an even number, two bilinear texture samples, bilinear samples 202 are positioned at the center of major axis 201. Bilinear samples 202 are offset by a distance from the center of major axis that is based on the fractional portion of the anisotropic ratio and weights are computed for bilinear samples 202, as described in conjunction with FIG. 4. In some embodiments of the present invention, the distance is half of the fractional portion of the anisotropic ratio.

Figure 2B:
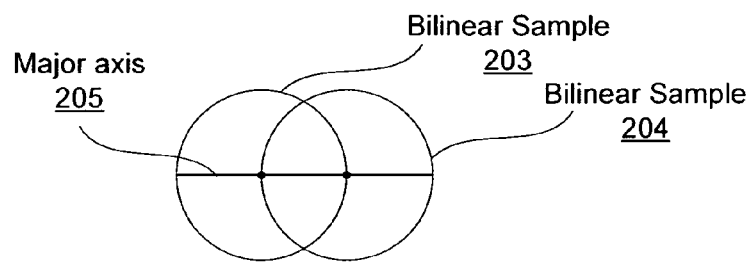

FIG. 2B is a diagram of positioning bilinear texture samples, bilinear sample 203 and 204, along a major axis 205 to approximate an anisotropic footprint in accordance with one or more aspects of the present invention. The anisotropic ratio corresponding to major axis 205 is between one and two. Therefore, two bilinear texture samples, bilinear samples 203 and 204 are positioned on either side of the center of major axis 205, as described in conjunction with FIG. 4.

Figure 2C:
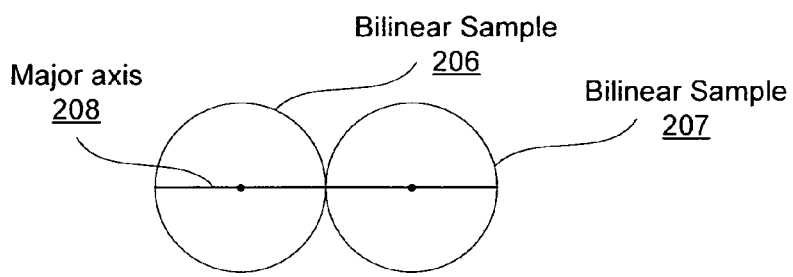

FIG. 2C is a diagram of positioning bilinear texture samples, bilinear sample 207 and 206, along a major axis 208 to approximate an anisotropic footprint in accordance with one or more aspects of the present invention. The anisotropic ratio corresponding to major axis 208 is equal to two. Therefore, two bilinear texture samples, bilinear samples 206 and 207 are positioned on either side of the center of major axis 208, resulting in the same positioning as conventional systems for anisotropic texture filtering.

Figure 2D:
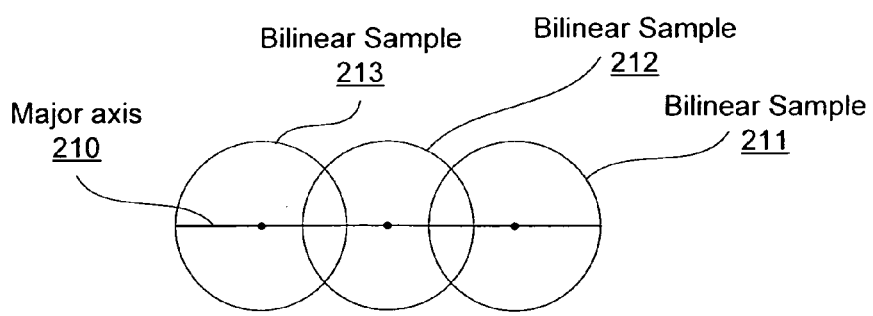

FIG. 2D is a diagram of positioning bilinear texture samples, bilinear sample 211, 212, and 213, along a major axis 210 to approximate an anisotropic footprint in accordance with one or more aspects of the present invention. The anisotropic ratio corresponding to major axis 210 is greater than two and less than three. Bilinear samples 213 and 211 are positioned at the ends of major axis 210 without extending beyond major axis 210 and an additional bilinear sample, bilinear sample 212 is positioned in the center of major axis 210.

Figure 1A:
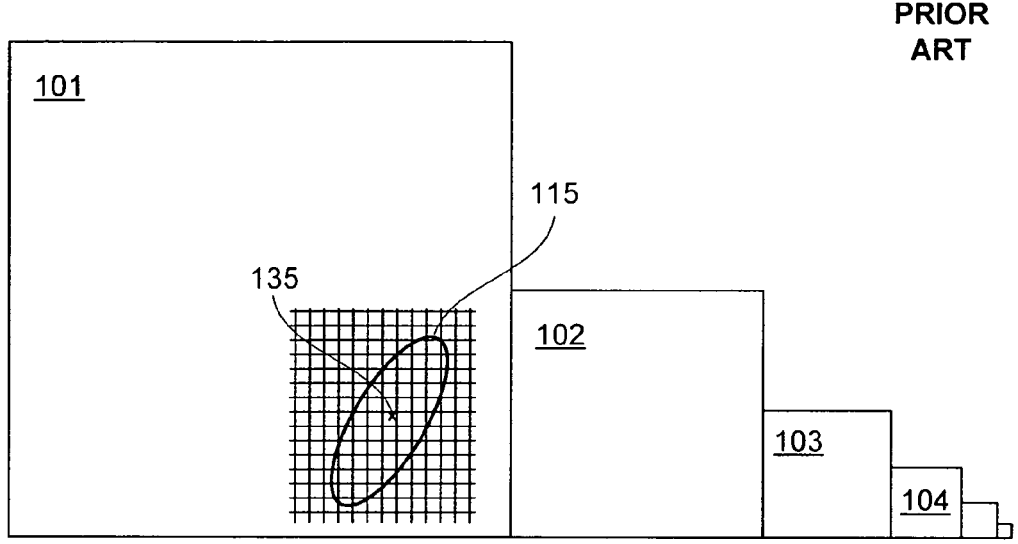
FIG. 1A is a conceptual diagram of prior art showing a mipmapped texture.
Figure 1B:
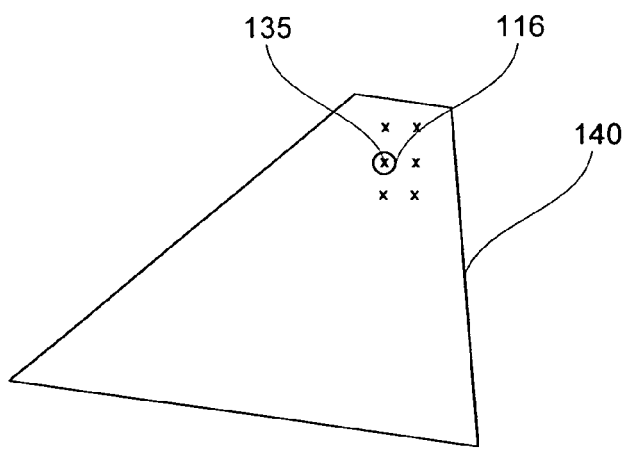
FIGS. 1B and 1C illustrate a prior art application of texture samples to a surface.
Figure 1C:
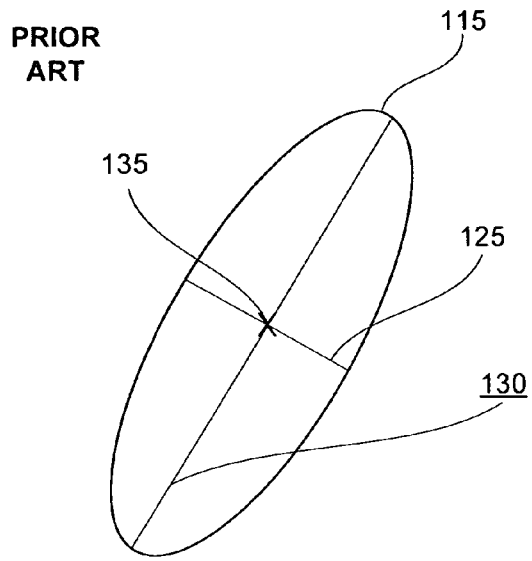
Figure 1D:
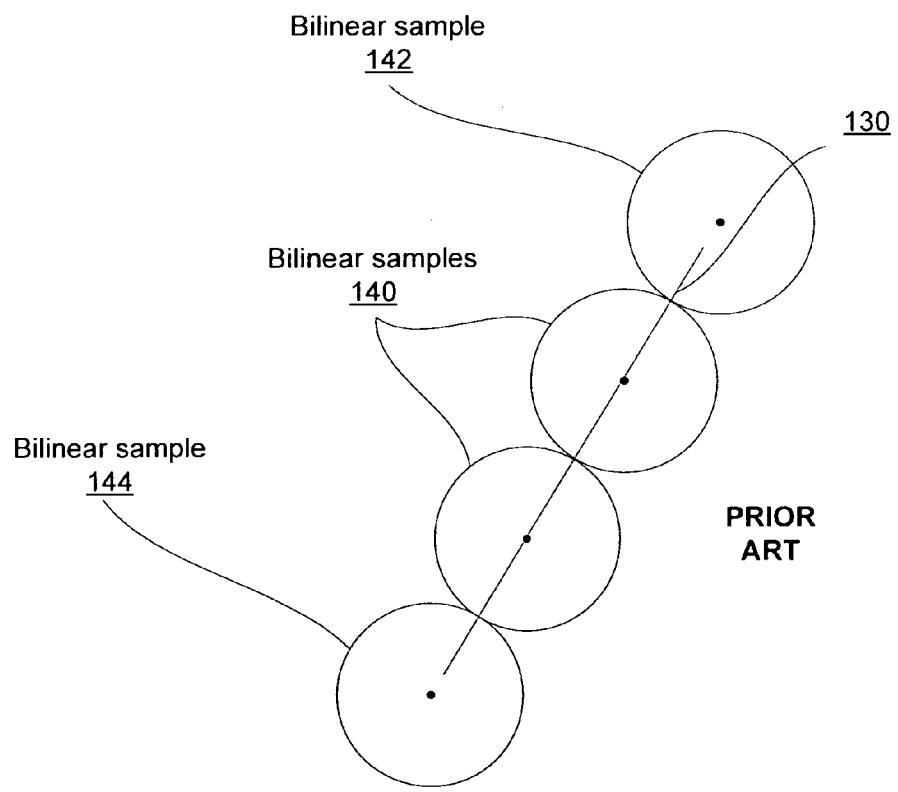
FIG. 1D illustrates a prior art application of bilinear samples that are positioned along a major axis to approximate an elliptical footprint.

In contrast, in some conventional systems, as previously described in conjunction with FIG. 1D, four bilinear samples are used to approximate a footprint for a major axis whose length is greater than two and less than or equal to four. Specifically additional bilinear samples are positioned at the ends of the major axis extending beyond the major axis, approximating a footprint with an anisotropic ratio of four. Although, in the conventional systems, the bilinear samples at the ends may be weighed less than the other bilinear samples, they nonetheless sample texels that lie outside of the anisotropic footprint which is undesirable. Furthermore, texels for four bilinear samples are read and processed in the conventional system when only three are needed to span the major axis. Reading and processing more texels than are necessary may reduce texture mapping performance and is therefore undesirable. When the anisotropic ratio is greater than an even number and less than an odd number, one less bilinear sample is used to cover the major axis using the bilinear sample positioning technique of the present invention compared with a conventional system.

Figure 4:
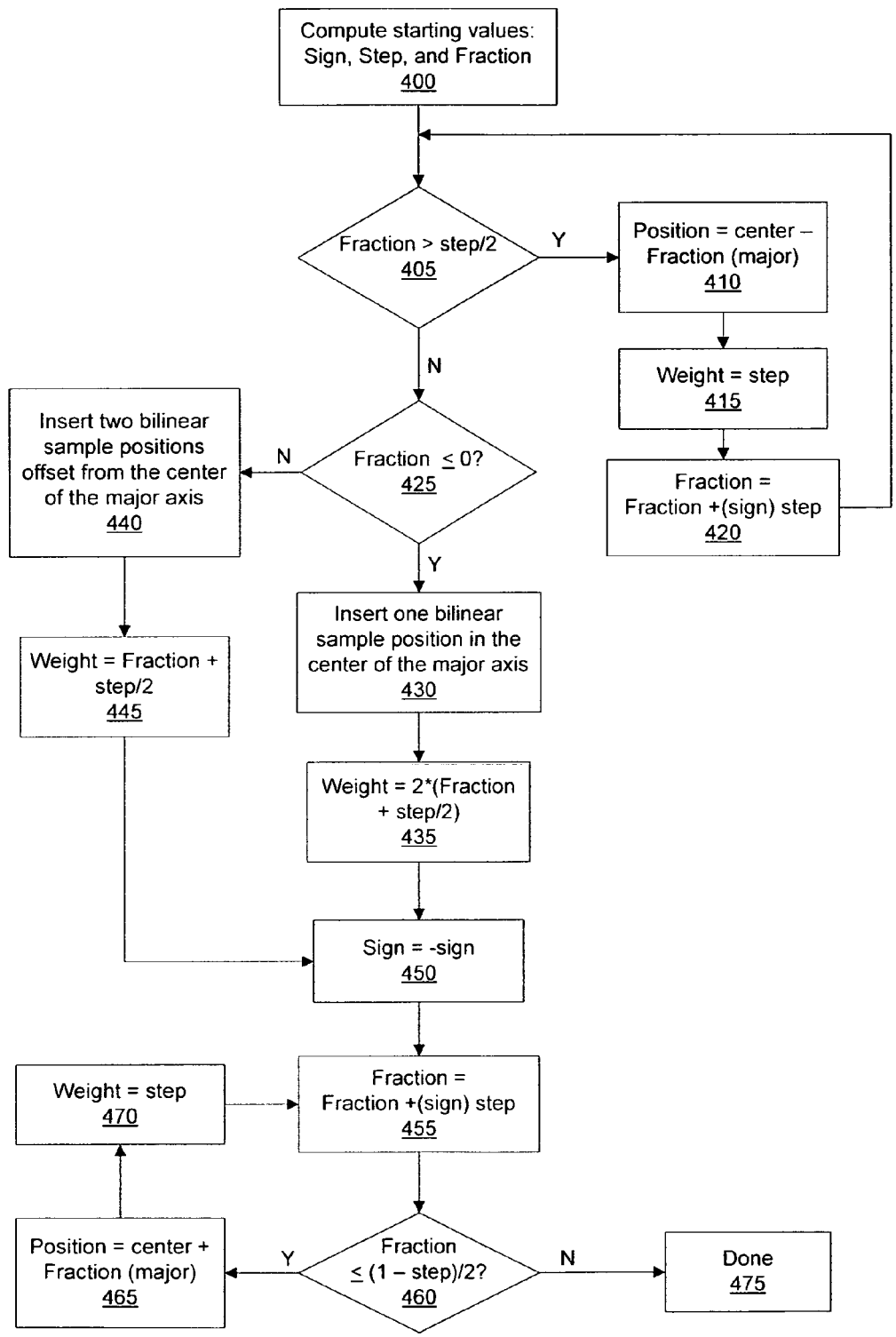
FIG. 4 illustrates an embodiment of a method for positioning bilinear samples for even and odd anisotropic ratios in accordance with one or more aspects of the present invention.

As described in conjunction with FIG. 4, a weight is computed for bilinear sample 212 that is less than the weight used for bilinear samples 210 and 211. However, all of the texels that contribute to the final filtered texture value lie within the anisotropic footprint, minimizing visual artifacts resulting from undersampling within the footprint or sampling outside of the footprint. Therefore, performance and image quality may be improved using the present invention for positioning and weighting bilinear samples for anisotropic filtering compared with conventional systems.

Figure 2E:
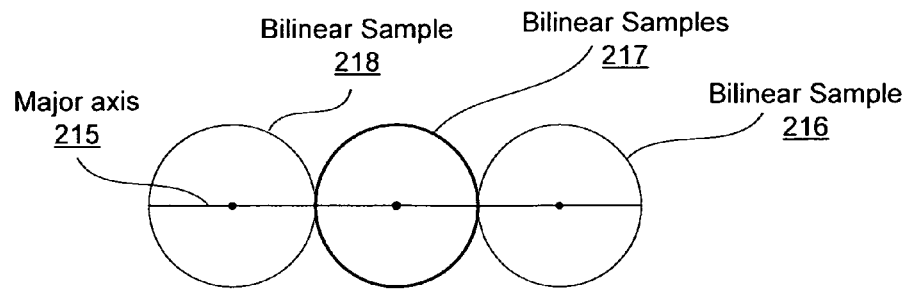

FIG. 2E is a diagram of positioning bilinear texture samples, bilinear sample 216 and 218 and bilinear samples 217, along a major axis 215 to approximate an anisotropic footprint in accordance with one or more aspects of the present invention. The anisotropic ratio corresponding to major axis 215 is slightly greater than three. Bilinear samples 216 and 218 are positioned at the ends of major axis 215 without extending beyond major axis 215 and a pair of additional bilinear samples, bilinear samples 217 is positioned with a bilinear sample on either side of the center of major axis 215.

In contrast with some conventional systems where the additional bilinear samples are positioned at the ends of the major axis, possibly extending beyond the major axis, as previously described in conjunction with FIG. 1D, the additional bilinear samples are positioned in the center of major axis using the techniques of the present invention. As the anisotropic ratio increases, the additional bilinear samples spread apart until the anisotropic ratio is equal to an even integer value. As the anisotropic ratio increases beyond the even integer value a single additional bilinear sample is inserted in the center of the footprint, and so on. The additional bilinear samples, such as bilinear samples 217 are weighted less than the bilinear samples, such as bilinear samples 216 and 218 that are positioned further away from the center of the major axis, e.g., major axis 215.

Figure 2F:
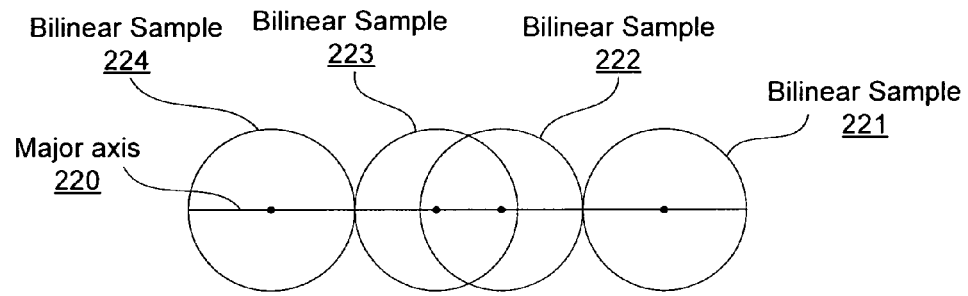

FIG. 2F is a diagram of positioning bilinear texture samples, bilinear sample 221 and 224 and additional bilinear samples 222 and 223, along a major axis 220 to approximate an anisotropic footprint in accordance with one or more aspects of the present invention. The anisotropic ratio corresponding to major axis 220 is between 3 and 3.5. Bilinear samples 221 and 224 are positioned at the ends of major axis 220 without extending beyond major axis 220 and the additional bilinear samples, bilinear sample 221 and 224 are positioned on either side of the center of major axis 220. Bilinear samples 222 and 223 are weighted less than bilinear samples 221 and 224 to produce an anisotropically filtered texture value for the footprint. Specifically, the weight for texture sample 222 and 223 is based on the distance between the additional sample and the center of major axis 220.

Figure 2G:
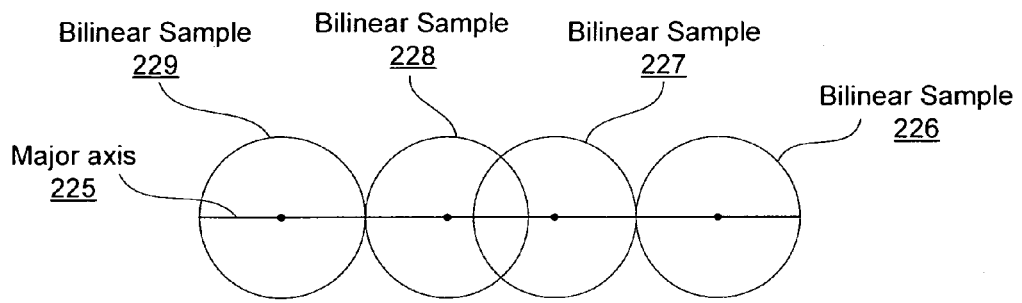

FIG. 2G is a diagram of positioning bilinear texture samples, bilinear sample 226 and 229 and additional bilinear samples 227 and 228, along a major axis 225 to approximate an anisotropic footprint in accordance with one or more aspects of the present invention. The anisotropic ratio corresponding to major axis 225 is between 3.5 and 4. Bilinear samples 226 and 229 are positioned at the ends of major axis 225 without extending beyond major axis 225 and the additional bilinear samples, bilinear sample 227 and 228 are positioned on either side of the center of major axis 225.

Figure 2H:
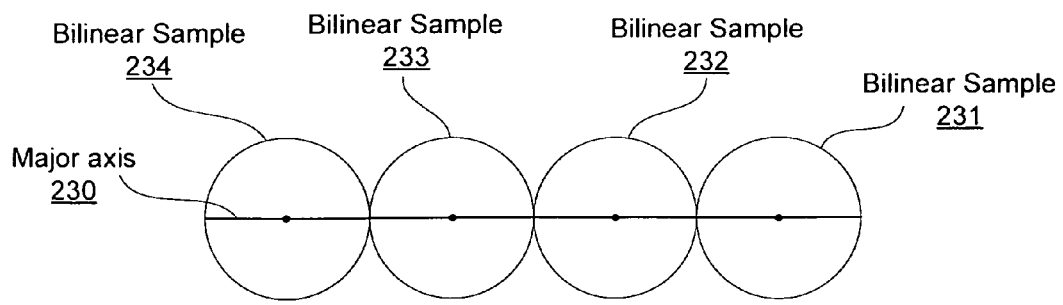

FIG. 2H is a diagram of positioning bilinear texture samples, bilinear sample 231 and 234 and additional bilinear samples 232 and 233, along a major axis 230 to approximate an anisotropic footprint in accordance with one or more aspects of the present invention. The anisotropic ratio corresponding to major axis 230 is four. Bilinear samples 231 and 234 are positioned at the ends of major axis 230 without extending beyond major axis 230 and the additional bilinear samples, bilinear sample 232 and 233 are positioned on either side of the center of major axis 230. Because the anisotropic ratio is an even integer value, the sample positioning for an even integer anisotropic ratio may be the same as is used in a conventional system. Each bilinear sample is weighed equally to produce the anisotropically filtered texture value.

Figure 3:
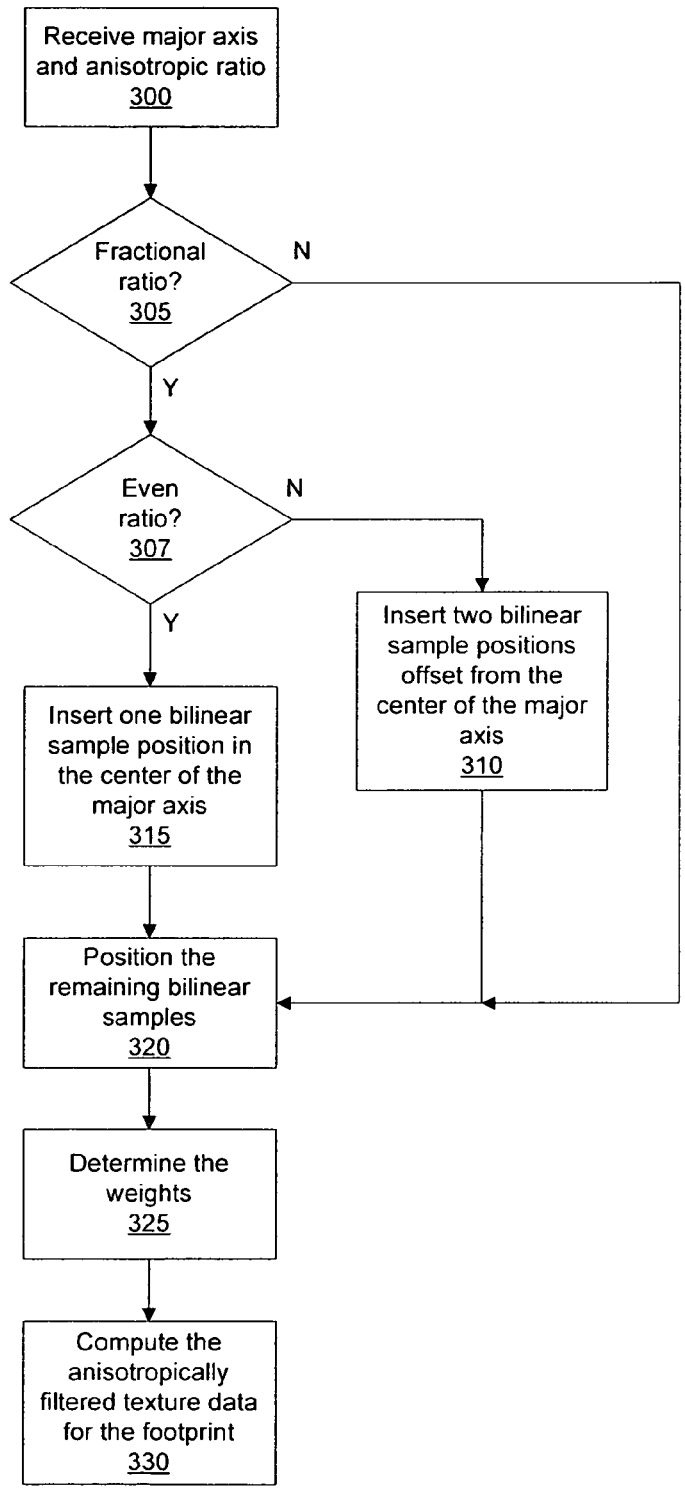
FIG. 3 illustrates an embodiment of a method for performing anisotropic filtering in accordance with one or more aspects of the present invention.

FIG. 3 illustrates an embodiment of a method for performing anisotropic filtering in accordance with one or more aspects of the present invention. In step 300 the major axis of anisotropy (a vector) is received and the anisotropic ratio is received. In step 305 the method determines if the anisotropic ratio has a fractional component, i.e., lies between two integers, and, if not, the method proceeds to step 320. If, in step 305, the method determines that the anisotropic ratio does have a fractional component, then in step 307 the method determines if the integer portion of the anisotropic ratio is an even number. If, in step 307, the method determines that the integer portion of the anisotropic ratio is an even number, then in step 315 a single additional bilinear sample is positioned at the center of the major axis. If, in step 307, the method determines that the integer portion of the anisotropic ratio is not an even number, i.e., the integer portion is an odd number, then in step 310 two additional bilinear samples are positioned on either side of the center of the major axis, offset by a distance from the center that is based on the fractional component. In other embodiments of the present invention, the bilinear samples may be positioned and processed starting at either end of the major axis in order to increase locality and access a texture cache efficiently.

In step 320 the remaining bilinear samples are positioned according to the method to cover the major axis, as described in conjunction with FIG. 4. Specifically, the number of remaining bilinear samples is equal to the integer portion of the anisotropic ratio when the integer is even and is equal to one less than the integer portion of the anisotropic ratio when the integer is odd. When the anisotropic ratio does not have a fractional component, the number of remaining bilinear samples is simply equal to the anisotropic ratio.

In step 325 the weight of each bilinear sample is computed according to the method, as described in conjunction with FIG. 4. The weight of an additional bilinear sample inserted in step 310 or 315 is less than the weight of the other bilinear samples that are positioned further from the center of the major axis.

In step 330 anisotropically filtered texture data is computed for the footprint corresponding to the major axis of anisotropy. Four texels are obtained and bilinearly filtered to compute each bilinear sample. The bilinear samples are each scaled by their corresponding computed weight and summed to produce a filtered texture value for an anisotropic footprint within an LOD texture map. When trilinear filtering is used, the computed weights may include the weight of the mipmap level for the LOD. The filtered texture value may be combined with another filtered texture value from another LOD texture map to produce a trilinearly filtered texture value. In some embodiments of the present invention, a filtered texture value may be produced for each LOD texture map and then scaled by the weight of the mipmap level for the LOD. Persons skilled in the art will appreciate that any system configured to perform the method steps of FIG. 3 or their equivalents, is within the scope of the present invention.

When trilinear filtering is performed and steps 300, 305, 307, 310, 315, 320, and 325 shown in FIG. 3 are completed for two texture map LODs. In some embodiments of the present invention, mipmap levels are numbered such that level 0 is the highest resolution, "base" level, and level k is half the size in each dimension of level k−1, for all k up to the apex of the pyramid. Increasing the LOD value effectively increases the diameter of each bilinear texture sample since the texture samples are read from a lower resolution mipmap.

The target level of detail, LODt, is base-two log of the length of the minor axis. Other techniques known to those skilled in the art may be used to compute an LOD. Generally, when performing anisotropic filtering with trilinear interpolation between mipmap levels for each isotropic tap, the two LODs should be calculated as follows. The fine texture map LOD, LODfine, is set to the integer portion of LODt, and the coarse level LOD, LODcoarse, is set to LODfine+1. Interpolation between the two levels is performed according to the LODfrac parameter, which equals the fractional part of LODt. When performing anisotropic filtering with bilinear (not trilinear) filtering, the single LODfine is calculated by rounding LODt to the nearest integer. LODcoarse and LODfrac are irrelevant for bilinear filtering.

FIG. 4 illustrates an embodiment of a method for positioning bilinear samples and computing weights for even and odd anisotropic ratios in accordance with one or more aspects of the present invention. The method shown in FIG. 4 may be used to perform steps 310, 315, 320, and 325 of FIG. 3 and is described in the context of specific examples in conjunction with FIGS. 5A, 5B, and 5C. The method positions bilinear samples starting at the negative end of the major axis and continues to position bilinear samples until the opposing end of the major axis is reached. Any "slack" between the bilinear samples is accounted for in the center of the major axis, resulting in intersecting bilinear samples in the center of the major axis. In contrast, conventional systems may not have intersecting bilinear samples, but instead the bilinear samples may extend beyond the ends of the major axis, thereby sampling texels that are not covered by the footprint.

In step 400 starting values are initialized to compute bilinear sample positions for an anisotropic footprint. Specifically, a sign is initialized as −1 and a step is computed as 1/ratio, where ratio is the anisotropic ratio. A fraction is computed as half of the difference between one and the step, i.e., (1−step)/2.

In step 405 the method determines if the fraction is greater than step/2, and, if so, in step 410 a bilinear sample position is computed as the difference between the center of the major axis and the product of fraction and major, where major is a vector representing the major axis of anisotropy. Therefore, a bilinear sample position is inserted on the negative side of the major axis. The center position is represented by texture map coordinates, such as (s,t). In step 415 a weight equal to the step is computed for the bilinear sample position. In step 420 the fraction is updated by subtracting the step from the previous fraction and the method returns to step 405.

If, in step 405 the method determines that the fraction is not greater than step/2, then the method proceeds to step 425. In step 425 the method determines if the fraction is less than or equal to zero, and, if so, in step 430 a single bilinear sample position is inserted in the center of the major axis, position=center. In step 435 a weight equal to twice the sum of the fraction and step/2 is computed for the single bilinear sample position.

If, in step 425 the method determines that the fraction is greater than zero, then in step 440 two bilinear sample positions are inserted on either side of the center of the major axis. Specifically, a first bilinear sample is positioned at position=center−fraction*major and a second bilinear sample is positioned at position=center+fraction*major. Therefore, each of the inserted bilinear sample positions is offset from the center of the major axis by a distance of fraction*major. In step 435 a weight equal to the sum of the fraction and step/2 is computed for each of the bilinear sample position inserted in step 440.

In step 450 the sign is negated as the method proceeds to continue to position any remaining bilinear samples on the positive side of the major axis. In step 455 the fraction is updated by adding the step to the previous fraction. In step 460 the method determines if fraction is less than or equal to the difference between half of major and half of step, and, if not, the method proceeds to step 475 and is done. An anisotropically filtered texture value may then be computed for the footprint. If, in step 460 the method determines that fraction is greater than the difference between half the length of major and half of step, then in step 465 a bilinear sample is positioned at position=center+fraction*major. In step 470 a weight equal to the step is computed for the bilinear sample position inserted in step 465 and the method returns to step 455.

Persons skilled in the art will appreciate that any system configured to perform the method steps of FIG. 4 or their equivalents, is within the scope of the present invention. In some embodiments of the present invention, a function may be used to perform the steps shown in FIG. 4. The pseudo-code shown in Table 1 represents such a function, where ½ is half the length of the major axis. By way of illustration, the pseudo-code is defined using C. However, any other language may be used to define the function.

TABLE 1

```
// starting to the left of the center of the major axis
for (fraction = ½ – step/2; fraction > step/2; fraction –= step) {
        position a bilinear sample at center – fraction*major
        weight is step
}
// position additional bilinear sample(s) in the center of the major axis
if (fraction <= 0) { // a single bilinear sample in the center
        position a bilinear sample at center
        weight is 2*(fraction + step/2)
        fraction += step
} else { // a pair of bilinear samples around the center
        position a bilinear sample at center – fraction*major, and
        position a bilinear sample at center + fraction*major
        weight of each is (fraction + step/2)
        fraction += step
}
// continuing to the right of the center of the center of the major axis
for (; fraction <= ½ – step/2; fraction += step) {
        position a bilinear sample at center + fraction*major
        weight is step
}
```

Figure 5A:
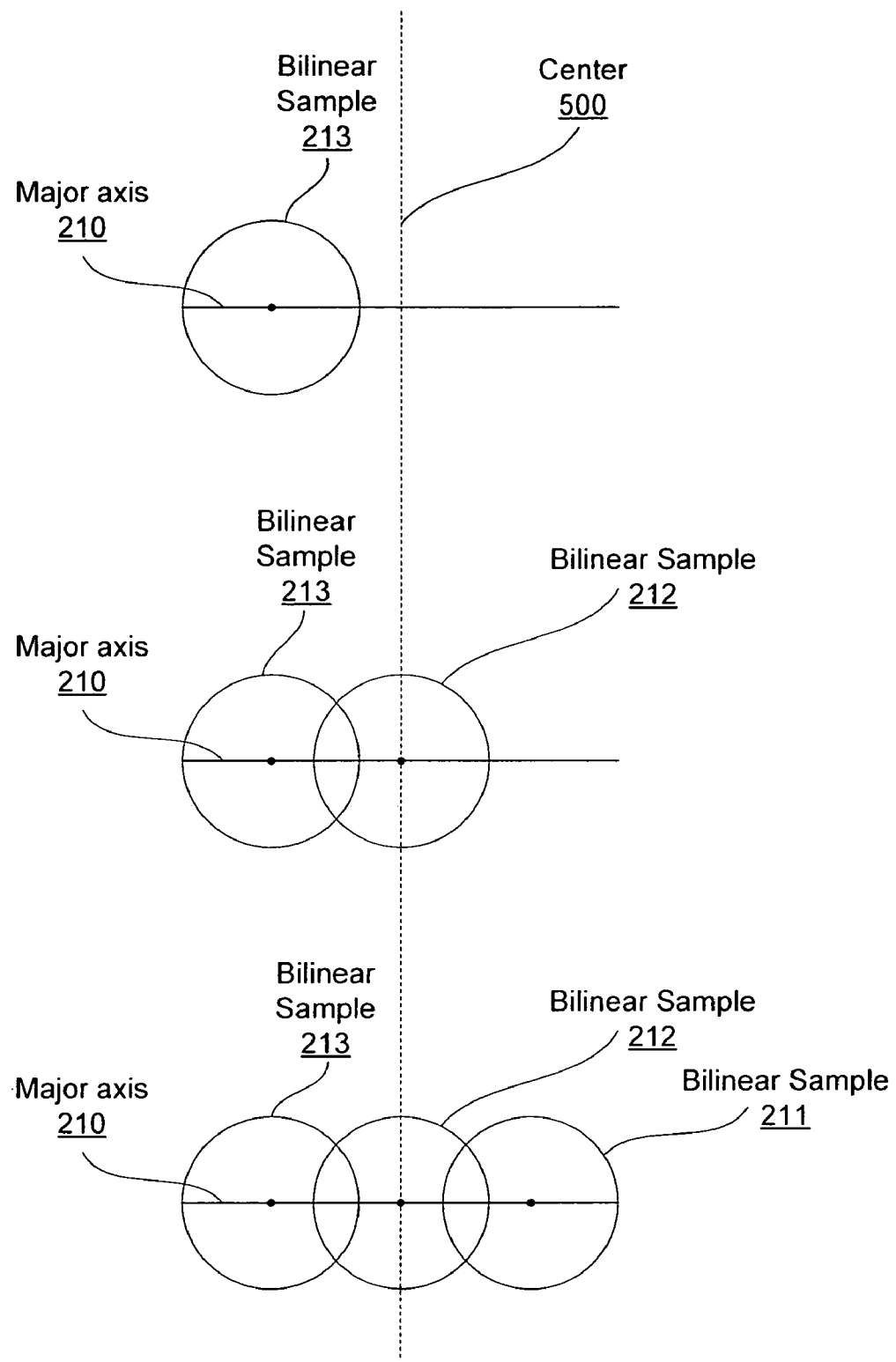
FIGS. 5A, 5B, and 5C illustrate positioning bilinear samples for anisotropic filtering in accordance with one or more aspects of the present invention.

FIG. 5A illustrates progressive positioning of bilinear samples 211, 212, and 213 from FIG. 2D on major axis 210 for anisotropic filtering in accordance with one or more aspects of the present invention. When the anisotropic ratio is greater than an even number and less than an odd number, one less bilinear sample is used to cover the major axis using the bilinear sample positioning technique of the present invention compared with a conventional system. Reading and processing more texels fewer texels to produce each anisotropically filtered texture value may improve texture mapping performance. Furthermore, all of the bilinear samples lie within the anisotropic footprint, therefore a higher quality image may result compared with using bilinear samples that are positioned to extend outside of the anisotropic footprint.

Center 500 indicates the center of major axis 210 and the anisotropic ratio is 2.5 and the major axis length is 2.5. A first bilinear sample position is determined for bilinear sample 213. The starting values are a negative sign, step of 1/2.5=0.4, and a fraction of (1−0.4)/2=0.3. Therefore, bilinear sample 213 is positioned at center−0.3*major and has a weight of 0.4. After bilinear sample 213 is positioned, fraction is updated to −0.1, indicating that the next bilinear sample, bilinear sample 212 should be inserted at the center of major axis 210.

Bilinear sample 212 is inserted at the center of major axis 210 and a weight of 0.2 is computed for bilinear sample 212 according to step 435 of FIG. 4. The sign is negated and fraction is updated to 0.3. A third bilinear sample, bilinear sample 211 is positioned at center+0.3*major and a weight of 0.4 is computed for bilinear sample 211. Fraction is updated to 0.7 which is greater than half the difference between one and the step. Therefore, all of the bilinear samples have been positioned and their corresponding weights have been computed.

Figure 5B:
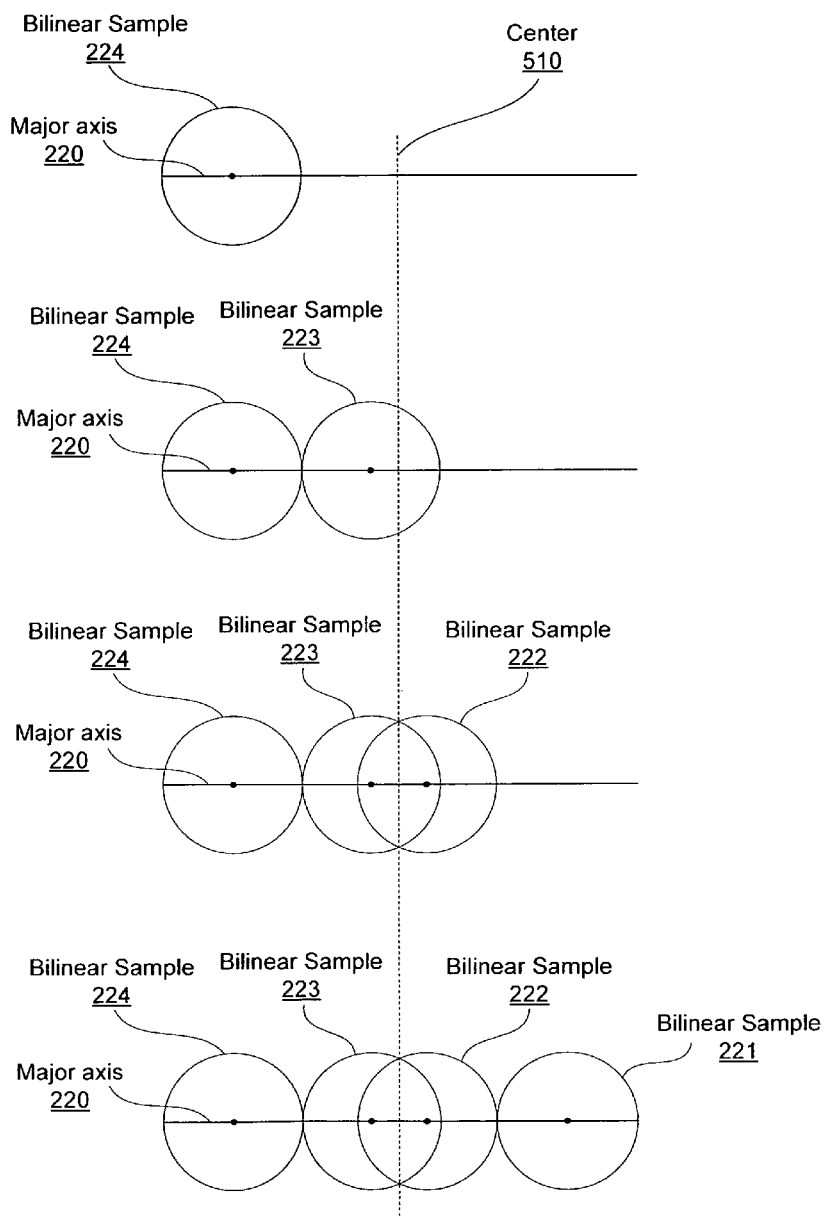

FIG. 5B illustrates progressive positioning of bilinear samples 221, 222, 223, and 224 from FIG. 2F on major axis 220 for anisotropic filtering in accordance with one or more aspects of the present invention. Center 510 indicates the center of major axis 220 having a length of 3.4 and an anisotropic ratio of 3.4. The starting values are a negative sign, step of 1/3.4~0.3, and a fraction of 0.35. Therefore, bilinear sample 224 is positioned at center−0.35*major and has a weight of 0.3. After bilinear sample 224 is positioned, fraction is updated to 0.05, indicating that a pair of bilinear samples, bilinear samples 222 and 223 should be inserted on either side of the center of major axis 220.

Bilinear sample 223 is positioned at center−0.05*major and bilinear sample 222 is positioned at center+0.05*major. A weight for bilinear sample 223 and 222 is computed as 0.2. The sign is negated and fraction is updated to 0.35. A fourth bilinear sample, bilinear sample 221 is positioned at center+0.35*major and a weight of 0.3 is computed for bilinear sample 221. Fraction is updated to 0.65 which is greater than the difference between one half and half of the step. Therefore, all of the bilinear samples have been positioned and their corresponding weights have been computed.

Figure 5C:
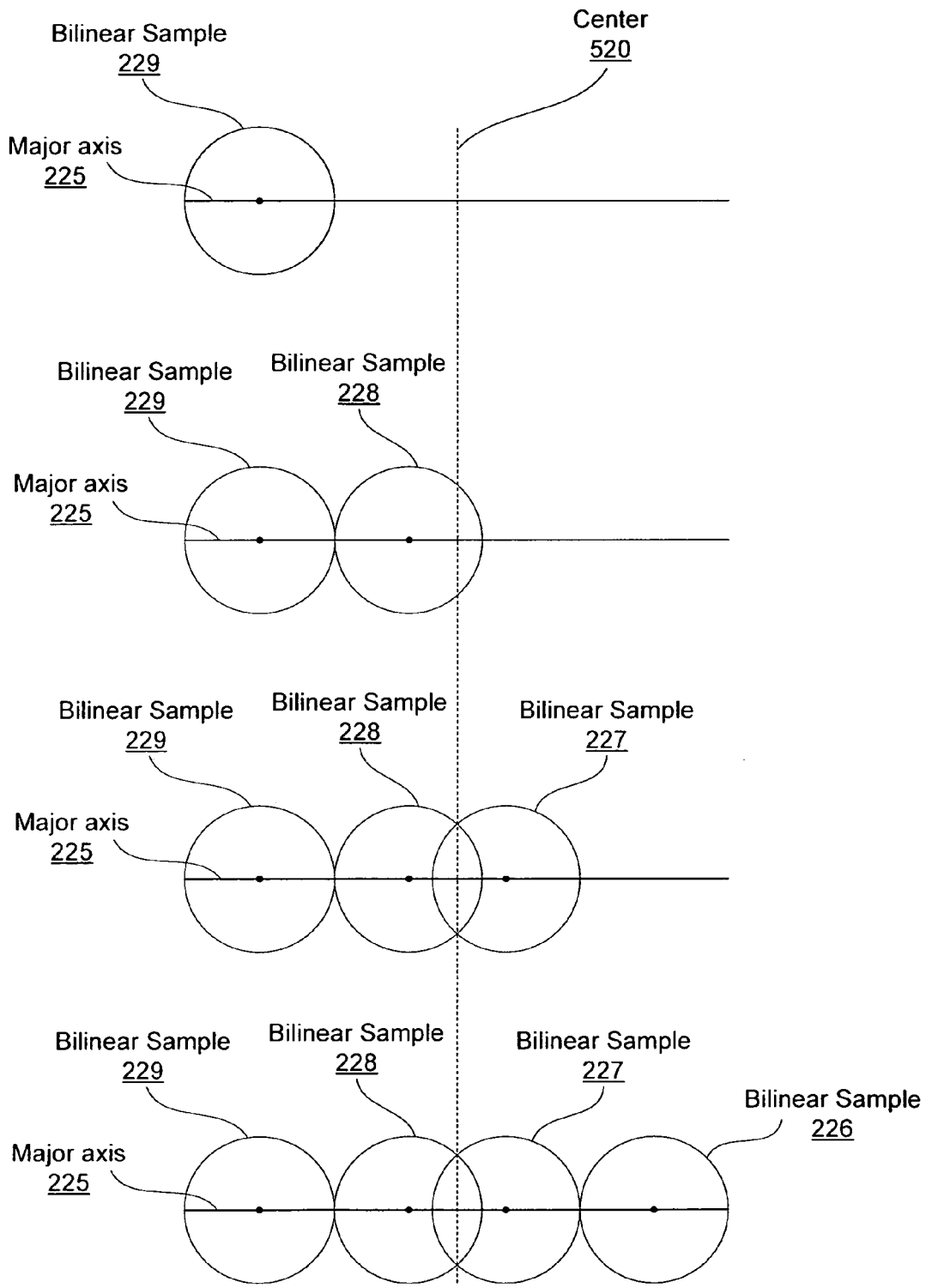

FIG. 5C illustrates progressive positioning of bilinear samples 226, 227, 228, and 229 from FIG. 2G on major axis 225 in accordance with one or more aspects of the present invention. Center 520 indicates the center of major axis 225 having a length of 3.6 and an anisotropic ratio of 3.6. The starting values are a negative sign, step of 1/3.6~0.28, and a fraction of 0.36. Therefore, bilinear sample 229 is positioned at center−0.36*major and has a weight of 0.28. After bilinear sample 229 is positioned, fraction is updated to 0.08, indicating that a pair of bilinear samples, bilinear samples 227 and 228 should be inserted on either side of the center of major axis 225.

Bilinear sample 227 is positioned at center−0.08*major and bilinear sample 228 is positioned at center+0.08*major. A weight for bilinear sample 228 and 227 is computed as 0.22. Note that the weight for bilinear samples 227 and 228 is greater than the weight computed for bilinear samples 222 and 223 of FIG. 4B. This is because bilinear samples 227 and 228 are positioned further apart along the major axis.

After bilinear samples 227 and 228 are positioned, the sign is negated and fraction is updated to 0.36. A fourth bilinear sample, bilinear sample 226 is positioned at center+0.36*major and a weight of 0.28 is computed for bilinear sample 226. Fraction is updated to 0.64 which is greater than the difference between one half and half of the step. Therefore, all of the bilinear samples have been positioned and their corresponding weights have been computed.

For any non-integer anisotropic ratio a single or pair of bilinear samples are positioned in the center or offset from the center of the major axis, ensuring that all of the bilinear samples positioned along the major axis lie within the footprint. Therefore, texels outside of the footprint are not included in the anisotropic filtering computation, resulting in a higher quality image compared with using a technique that includes texels that are not within the footprint.

Figure 6:
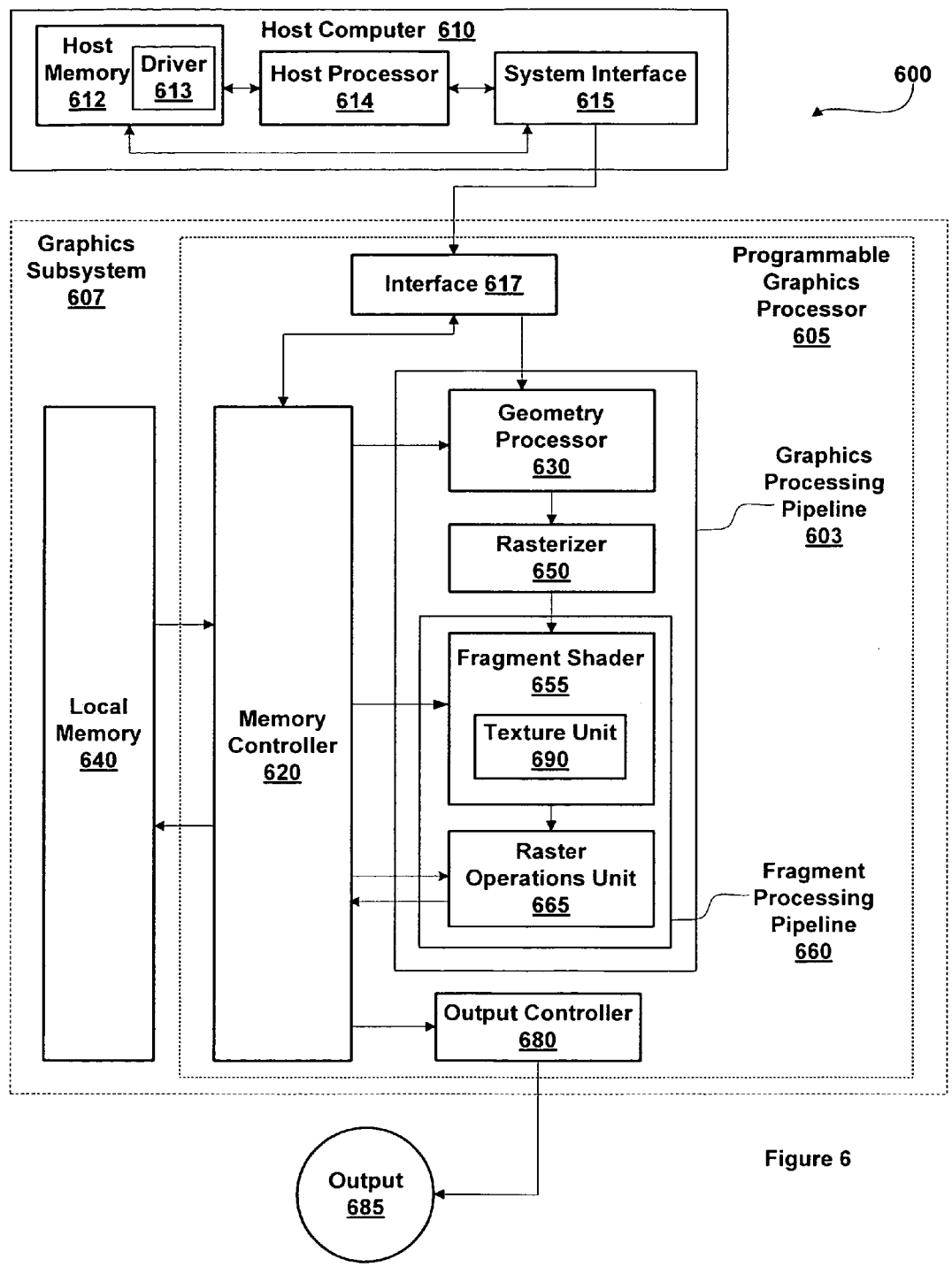
FIG. 6 is a block diagram of an exemplary embodiment of a respective computer system in accordance with one or more aspects of the present invention including a host computer and a graphics subsystem.

FIG. 6 is a block diagram of an exemplary embodiment of a respective computer system, generally designated 600, and including a host computer 610 and a graphics subsystem 607 in accordance with one or more aspects of the present invention. Computing system 600 may be a desktop computer, server, laptop computer, palm-sized computer, tablet computer, game console, portable wireless terminal such as a PDA (personal digital assistant) or cellular telephone, computer based simulator, or the like. Host computer 610 includes host processor 614 that may include a system memory controller to interface directly to host memory 612 or may communicate with host memory 612 through a system interface 615. System interface 615 may be an I/O (input/output) interface or a bridge device including the system memory controller to interface directly to host memory 612. An example of system interface 615 known in the art includes Intel® Northbridge.

A graphics device driver, driver 613, interfaces between processes executed by host processor 614, such as application programs, and a programmable graphics processor 605, translating program instructions as needed for execution by programmable graphics processor 605.

Graphics subsystem 607 includes a local memory 640 and programmable graphics processor 605. Host computer 610 communicates with graphics subsystem 670 via system interface 615 and a graphics interface 617 within programmable graphics processor 605. Data, program instructions, and commands received at graphics interface 617 can be passed to a graphics processing pipeline 603 or written to a local memory 640 through memory management unit 620. Programmable graphics processor 605 uses memory to store graphics data, including texture maps, and program instructions, where graphics data is any data that is input to or output from computation units within programmable graphics processor 605. Graphics memory is any memory used to store graphics data or program instructions to be executed by programmable graphics processor 605. Graphics memory can include portions of host memory 612, local memory 640 directly coupled to programmable graphics processor 605, storage resources coupled to the computation units within programmable graphics processor 605, and the like. Storage resources can include register files, caches, FIFOs (first in first out memories), and the like.

In addition to interface 617, programmable graphics processor 605 includes a graphics processing pipeline 603, a memory controller 620 and an output controller 660. Data and program instructions received at interface 617 can be passed to a geometry processor 630 within graphics processing pipeline 603 or written to local memory 640 through memory controller 620. In addition to communicating with local memory 640, and interface 617, memory controller 620 also communicates with graphics processing pipeline 603 and output controller 660 through read and write interfaces in graphics processing pipeline 603 and a read interface in output controller 680.

Within graphics processing pipeline 603, geometry processor 630 and a programmable graphics fragment processing pipeline, fragment processing pipeline 660, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 630 and fragment processing pipeline 660 are optionally configured such that data processing operations are performed in multiple passes through graphics processing pipeline 603 or in multiple passes through fragment processing pipeline 660. Each pass through programmable graphics processor 605, graphics processing pipeline 603 or fragment processing pipeline 660 concludes with optional processing by a raster operations unit 665.

Vertex programs are sequences of vertex program instructions compiled by host processor 614 for execution within geometry processor 630 and rasterizer 650. Shader programs are sequences of shader program instructions compiled by host processor 614 for execution within fragment processing pipeline 660. Geometry processor 630 receives a stream of program instructions (vertex program instructions and shader program instructions) and data from interface 617 or memory controller 620, and performs vector floating-point operations or other processing operations using the data. The program instructions configure subunits within geometry processor 630, rasterizer 650 and fragment processing pipeline 660. The program instructions and data are stored in graphics memory, e.g., portions of host memory 612, local memory 640, or storage resources within programmable graphics processor 605.

Data processed by geometry processor 630 and program instructions are passed from geometry processor 630 to a rasterizer 650. Rasterizer 650 is a sampling unit that processes primitives and generates sub-primitive data, such as fragment data, including parameters associated with fragments (texture identifiers, texture coordinates, and the like). Rasterizer 650 converts the primitives into sub-primitive data by performing scan conversion on the data processed by geometry processor 630. Rasterizer 650 outputs fragment data and shader program instructions to fragment processing pipeline 660.

The shader programs configure the fragment processing pipeline 660 to process fragment data by specifying computations and computation precision. Fragment shader 655 is optionally configured by shader program instructions such that fragment data processing operations are performed in multiple passes within fragment shader 655. Fragment shader 655 includes texture unit 690 to perform anisotropic or isotropic texture mapping and produce filtered texels. Texture unit 690 approximates anisotropic footprints and may be configured to perform optimizations to produce textured fragments while balancing image quality and performance. Texture unit 690 may also determine positions for bilinear texture samples and compute weights for the bilinear texture samples, as described in conjunction with FIGS. 3 and 4. The textured fragments are processed using techniques known to those skilled in the art to produce shaded fragment data.

Fragment shader 655 outputs the shaded fragment data, e.g., color and depth, and codewords generated from shader program instructions to raster operations unit 665. Raster operations unit 665 includes a read interface and a write interface to memory controller 620 through which raster operations unit 665 accesses data stored in local memory 640 or host memory 612. Raster operations unit 665 optionally performs near and far plane clipping and raster operations, such as stencil, z test, blending, and the like, using the fragment data and pixel data stored in local memory 640 or host memory 612 at a pixel position (image location specified by x,y coordinates) associated with the processed fragment data. The output data from raster operations unit 665 is written back to local memory 640 or host memory 612 at the pixel position associated with the output data and the results, e.g., image data are saved in graphics memory.

When processing is completed, an output 685 of graphics subsystem 607 is provided using output controller 680. Alternatively, host processor 614 reads the image stored in local memory 640 through memory controller 620, interface 617 and system interface 615. Output controller 680 is optionally configured by opcodes to deliver data to a display device, network, electronic control system, other computing system 600, other graphics subsystem 607, or the like.

Figure 7:
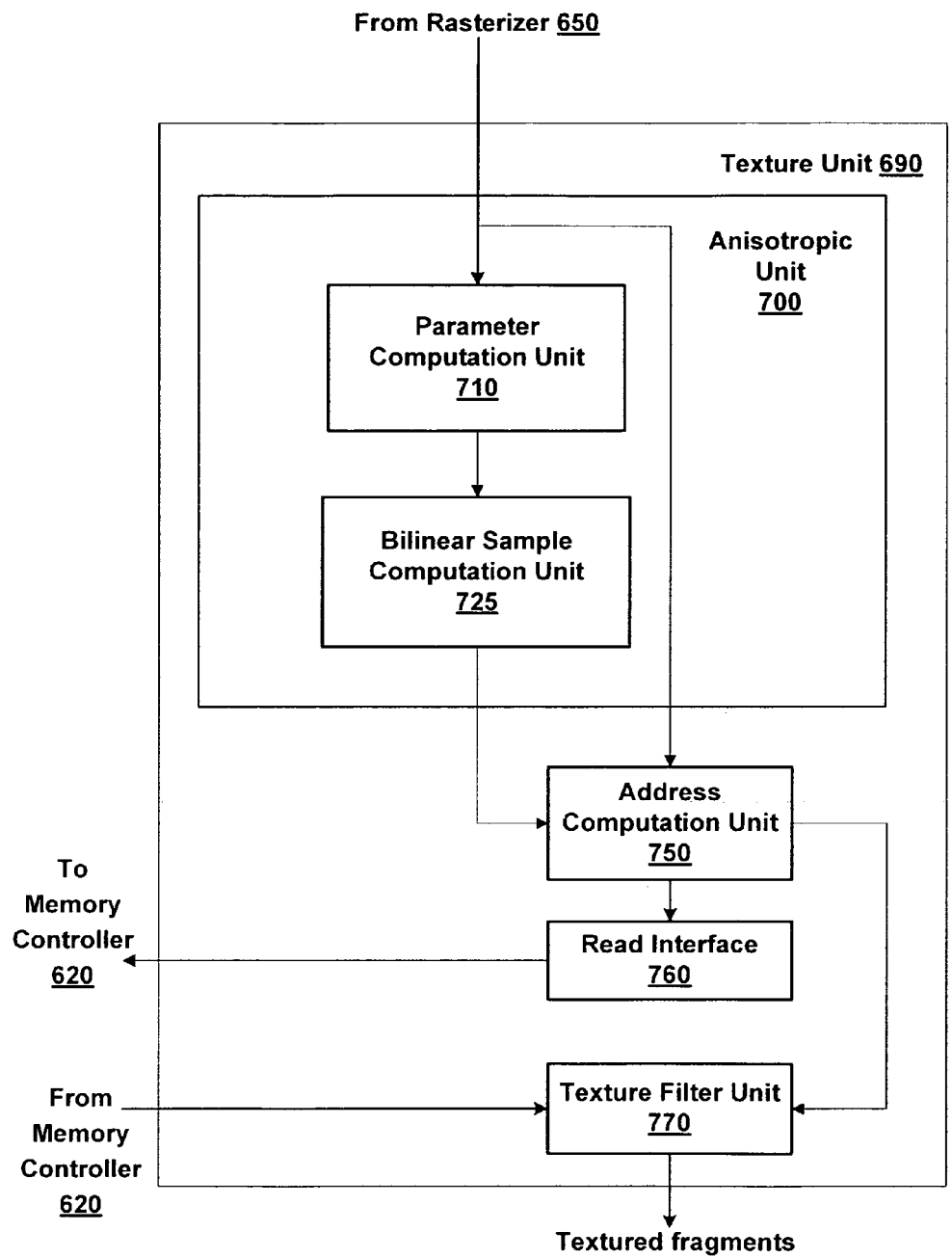
FIG. 7 is a block diagram of an exemplary embodiment of the texture unit from FIG. 6 in accordance with one or more aspects of the present invention.

FIG. 7 is a block diagram of an exemplary embodiment of texture unit 690 from FIG. 6 in accordance with one or more aspects of the present invention. In some embodiments, Texture unit 690 receives data, e.g., program instructions and parameters associated with fragments (texture identifiers, texture coordinates such as s, t, and r, and the like) from a rasterizer, such as rasterizer 650. Texture coordinates s, t, and r are typically represented in a floating point format such as a 32 bit format (1 bit sign, 23 bit mantissa, and 8 bit exponent). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. Texture unit 690 receives texture coordinates from rasterizer 650, uses the texture coordinates to perform anisotropic texture filtering of texels read from memory, and then outputs a filtered texture value corresponding to a set of texture coordinates associated with a fragment, e.g., a textured fragment.

Texture unit 690 includes an anisotropic unit 700. At a high level, anisotropic unit 700 computes anisotropic texture mapping parameters such as LODt, the log ratio and/or anisotropic ratio, and the axis of anisotropy. As previously described, these anisotropic texture mapping parameters are used to determine the number, position, and weight of bilinear texture samples to perform texture filtering for a fragment. In some embodiments of the present invention, anisotropic unit 700 outputs unnormalized texture coordinates, such as u, v, and p, that are dependent on mipmap dimensions for LODcoarse and LODfine and that are typically represented in a fixed point format. In other embodiments of the present invention, anisotropic unit 700 outputs normalized texture coordinates, such as s, t, and r. Anisotropic unit 900 also outputs bilinear texture sample positions, weights, LODfrac, LODfine, and LODcoarse.

A parameter computation unit 710 computes an anisotropic parameter, e.g., anisotropic ratio, or the like, using techniques known to those skilled in the art. Parameter computation unit 710 may also compute LODt, the axis of anisotropy, the length of the axis of anisotropy, and the like.

A bilinear sample computation unit 725 computes starting values for positioning bilinear texture samples along the axis of anisotropy and computes weights for each positioned bilinear texture sample. For example, bilinear sample computation unit 725 may be configured to perform steps 300, 305, 307, 310, 315, 320, and 325 of FIG. 3. Bilinear sample computation unit 725 outputs the weight and position, e.g., and unnormalized texture coordinates, such as u, v, and p, of each bilinear texture sample.

Address computation unit 750 uses the bilinear texture sample positions and texture parameters (texture identifier, and the like) received by texture unit 690 to determine addresses for reading texels (the first number of texels or the first and the second number of texels) from memory, e.g., local memory 640, host memory 612, or the like. Address computation unit 750 outputs the addresses to read interface 760. Read interface 760 outputs the addresses and a read request to memory controller 620.

The texels for each bilinear texture sample received by read interface 760 for one or more LODs, e.g., LODfine and LODcoarse, of a mipmapped texture map and are bilinearly or trilinearly filtered in a texture filter unit 770 to produce texture data for each bilinear texture sample. Texture filter unit 770 may receive fractional unnormalized texture coordinate values and LODfrac from address computation unit 760 to perform the bilinear or trilinear filtering. Texture filter unit 770 also receives the bilinear texture samples weights computed by bilinear sample computation unit 725 and scales the texture data for each bilinear texture sample by its corresponding weight and sums all of the scaled texture data to produce a filtered texture value for an anisotropic footprint corresponding to a fragment, i.e., a textured fragment. Textured fragments are further processed within a fragment shader, to compute a color for each fragment. In other embodiments of anisotropic unit 700 additional units may be included to perform other texture mapping functions known to those skilled in the art.

Figure 8:
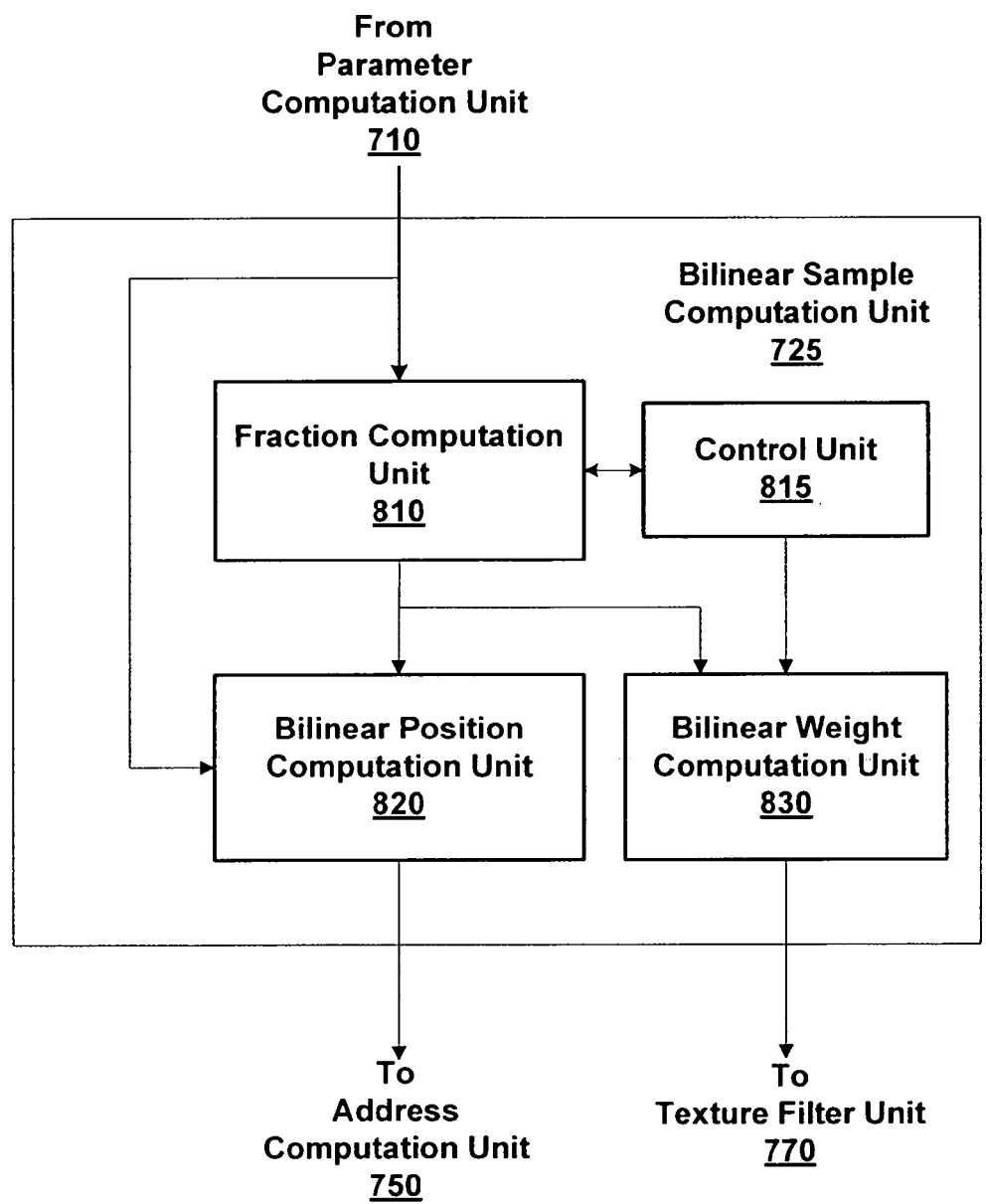
FIG. 8 is a block diagram of an exemplary embodiment of the bilinear sample computation unit from FIG. 7 in accordance with one or more aspects of the present invention.

FIG. 8 is a block diagram of an exemplary embodiment of bilinear sample computation unit 725 from FIG. 7 in accordance with one or more aspects of the present invention. Bilinear sample computation unit 725 receives an anisotropic ratio or the reciprocal of the anisotropic ratio, the length of the major axis of anisotropy, texture coordinates (specifying the center of the major axis of anisotropy), and the major axis of anisotropy (a vector) from parameter computation unit 710. Bilinear sample computation unit 725 includes a control unit 815, a fraction computation unit 810, a bilinear position computation unit 820, and a bilinear weight computation unit 830. Control unit 815 instructs fraction computation unit 810 and bilinear weight computation unit 830 to compute starting values and controls updating of the starting values based as needed to position the bilinear texture samples. Control unit 815 also determines when all of the bilinear texture samples have been positioned for an anisotropic footprint. In some embodiments of the present invention, control unit 815 is implemented as a finite state machine.

Fraction computation unit 810 computes step and fraction and updates fraction as each bilinear texture sample is placed. For example, fraction computation unit 810 may perform steps 400, 420, and 455 of FIG. 4. Fraction computation unit 810 outputs the step and fraction to a bilinear position computation unit 820 and a bilinear weight computation unit 830. Fraction computation unit 810 outputs fraction to control unit 815. Bilinear position computation unit 820 also receives the texture coordinates specifying the center of the axis of anisotropy and the major axis of anisotropy from parameter computation unit 710. Bilinear position computation unit 820 computes a position for each bilinear texture sample. For example, bilinear position computation unit 820 may perform steps 410, 430, 440, and 465 of FIG. 4. Bilinear weight computation unit 830 computes a weight for each bilinear texture sample. For example, bilinear weight computation unit 830 may perform steps 415, 445, 435, and 470 of FIG. 4. The weight and position for each bilinear texture sample are output by bilinear sample computation unit 725 to texture filter unit 770 and address computation unit 750, respectively.

Conventionally, an even number of bilinear texture samples are positioned along the major axis, even when an odd number of bilinear texture samples would cover the major axis. Furthermore, when the anisotropic ratio is not divisible by two, an additional bilinear texture sample is inserted at each end of the major axis, extending beyond the major axis. In contrast, the system and method of the present invention inserts either a single bilinear texture sample or a pair of additional bilinear texture samples, depending on the anisotropic ratio, in the center of the major axis. Therefore, all of the bilinear texture samples lie within the anisotropic footprint, resulting in a higher quality image and requiring fewer bilinear texture samples for anisotropic ratios that are greater than an even number and less than or equal to an odd number. Using fewer bilinear texture samples reduces the number of texels that are read and filtered to produce each anisotropically filtered texture value, possibly improving system performance.

While the foregoing is directed to embodiments of the present invention, other and further embodiments of the invention may be devised without departing from the basic scope thereof, and the scope thereof is determined by the claims that follow. Specifically, persons skilled in the art will recognize that bilinear texture sample positioning techniques set forth herein may be implemented either partially or entirely in a software program or a shader program executed by fragment shader 855 or host processor 614. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

I claim:

1. A computer-implemented method of positioning multiple bilinear texture samples along a major axis of anisotropy with a length greater than two, comprising:
   positioning a single one of the bilinear texture samples in a center of the major axis of anisotropy when an anisotropic ratio of a footprint defined as a length of the major axis of anisotropy divided by a length of a minor axis of anisotropy is greater than an even number and less than an odd number, wherein the odd number equals the even number summed with one;
   computing a weight, by a programmable graphics processor, for the single one of the bilinear texture samples that is less than a reciprocal of the anisotropic ratio of a footprint defined by the major axis of anisotropy;
   positioning remaining samples of the bilinear texture samples along the major axis of anisotropy to cover the length of the major axis of anisotropy;
   computing a weight, by the programmable graphics processor, for each of the remaining bilinear texture samples that is the reciprocal of the anisotropic ratio of the footprint defined by the major axis of anisotropy;
   processing the bilinear texture samples, by the programmable graphics processor, to produce an image that is suitable for display; and
   storing the image in a graphics memory.

2. The method of claim 1, wherein each of the two bilinear texture samples is positioned on the major axis of anisotropy at an offset distance from the center of the major axis of anisotropy, wherein the offset distance is half of a fractional portion of the anisotropic ratio of the footprint defined by the major axis of an isotropy.

3. The method of claim 1, wherein the two bilinear texture samples and the remaining samples are positioned to not extend beyond the major axis of anisotropy.

4. The method of claim 1, further comprising filtering the single one of the bilinear texture samples and the remaining samples to produce a filtered texture value for the footprint.

5. A computer-implemented method of computing positions and weights for bilinear texture samples on a major axis of anisotropy, comprising:
   computing, by a programmable graphics processor, a step as a reciprocal of a non-integer ratio of the major axis of anisotropy to a minor axis of anisotropy for a footprint;
   computing, by the programmable graphics processor, a fraction as half of a difference between one and the step;
   positioning one of the bilinear texture samples on the major axis of anisotropy offset from a center of the axis of anisotropy by the fraction multiplied by the length of the major axis of anisotropy;
   updating the fraction by subtracting step from the fraction;
   determining if the fraction is greater than half of the step;
   repeating the positioning, updating, and determining when the fraction is greater than half of the step;
   processing the bilinear texture samples, by the programmable graphics processor, to produce an image that is suitable for display; and
   storing the image in a graphics memory.

6. The method of claim 5, further comprising computing a weight for the positioned bilinear texture sample, wherein the weight is equal to the step.

7. The method of claim 5, further comprising:
   determining the fraction is not greater than zero when the fraction is not greater than half of the step; and
   inserting a single one of the bilinear texture samples on the major axis of anisotropy at the center of the axis of anisotropy.

8. The method of claim 7, further comprising:
   updating the fraction by adding the step to the fraction;
   positioning an additional one of the bilinear texture samples on the major axis of anisotropy offset from a center of the axis of anisotropy by the fraction multiplied by the length of the major axis of anisotropy;
   determining if the fraction is greater than a difference between one half and half of the step; and
   repeating the updating of the fraction by repeating the adding and the positioning of the additional bilinear texture sample, to produce one or more additional bilinear texture samples, when the fraction is not greater than the difference between one half and half of the step.

9. The method of claim 7, further comprising computing a weight for the single bilinear sample, wherein the weight is equal to the step summed with twice the fraction.

10. The method of claim 8, further comprising filtering all of the bilinear texture samples to produce a filtered texture value for the footprint.

11. The method of claim 5, further comprising:
    determining the fraction is greater than zero;
    inserting a first of two of the bilinear texture samples on the major axis of anisotropy offset from a center of the axis of anisotropy by the fraction multiplied by the length of the major axis of anisotropy; and
    inserting a second of the two of the bilinear texture samples on the major axis of anisotropy offset from a center of the axis of anisotropy by the fraction negated and multiplied by the length of the major axis of anisotropy.

12. The method of claim 11, further comprising:
    updating the fraction by adding the step to the fraction;
    positioning an additional one of the bilinear texture samples on the major axis of anisotropy offset from a center of the axis of anisotropy by the fraction multiplied by the length of the major axis of anisotropy;
    determining if the fraction is greater than a difference between one half and half of the step; and
    repeating the updating of the fraction by repeating the adding and the positioning of the additional bilinear texture sample, to produce one or more additional bilinear texture samples, when the fraction is greater than the difference between one half and half of the step.

13. The method of claim 11, further comprising computing a weight for each of the two of the bilinear samples, wherein the weight is equal to half of the step summed with the fraction.

14. The method of claim 12, further comprising filtering all of the bilinear texture samples to produce a filtered texture value for the footprint.

15. A texture unit, included within a programmable graphics processor, for performing anisotropic texture mapping to produce filtered texture values, comprising:
    a bilinear position computation unit, included within the programmable graphics processor, that is configured to position a single bilinear texture sample in a center of a major axis of anisotropy when an anisotropic ratio of a footprint defined as a length of the major axis of anisotropy divided by a length of a minor axis of anisotropy is greater than an even number and less than an odd number that equals the even number summed with one and configured to position remaining bilinear texture samples along the major axis of anisotropy to cover the length of the major axis of anisotropy;
    a bilinear weight computation unit, included within the programmable graphics processor, that is configured to compute a weight for the single bilinear texture sample that is less than a reciprocal of the anisotropic ratio of a footprint defined by the major axis of anisotropy and compute a weight for each of the remaining bilinear texture samples that is the reciprocal of the anisotropic ratio of the footprint defined by the major axis of anisotropy; and a texture filter unit, included within the programmable graphics processor, that is configured to combine the single bilinear sample and the remaining bilinear samples to produce a filtered texture value for the footprint that is further processed to produce an image that is displayed.

16. A computer-implemented method of positioning multiple bilinear texture samples along a major axis of anisotropy with a length greater than two, comprising:

positioning two of the bilinear texture samples on either side of a center of the major axis of anisotropy when an anisotropic ratio of a footprint defined as the length of the major axis of anisotropy divided by a length of a minor axis of anisotropy is greater than an odd number and less than an even number, wherein the even number equals the odd number summed with one;

computing a weight, by a programmable graphics processor, for the two bilinear texture samples that is less than a reciprocal of the anisotropic ratio of a footprint defined by the major axis of anisotropy;

positioning remaining samples of the bilinear texture samples along the major axis of anisotropy to cover the length of the major axis of anisotropy;

computing a weight, by the programmable graphics processor, for each of the remaining bilinear texture samples that is the reciprocal of the anisotropic ratio of the footprint;

processing the bilinear texture samples, by the programmable graphics processor, to produce an image that is suitable for display; and storing the image in a graphics memory.

17. A texture unit, included within a programmable graphics processor, for performing anisotropic texture mapping to produce filtered texture values, comprising:

a bilinear position computation unit, included within the programmable graphics processor, that is configured to position two bilinear texture samples on either side of a center of the major axis of anisotropy when an anisotropic ratio of a footprint defined as a length of the major axis of anisotropy divided by a length of a minor axis of anisotropy is greater than an odd number and less than an even number that equals the odd number summed with one, and to position remaining bilinear texture samples along the major axis of anisotropy to cover the length of the major axis of anisotropy;

a bilinear weight computation unit, included within a programmable graphics processor, that is configured to compute a weight for the two bilinear texture samples that is less than a reciprocal of the anisotropic ratio of a footprint and compute a weight for each of the remaining bilinear texture samples that is the reciprocal of the anisotropic ratio of the footprint defined by the major axis of anisotropy; and a texture filter unit, included within a programmable graphics processor, that is configured to combine the bilinear samples to produce a filtered texture value for the footprint that is further processed to produce an image that is displayed.

18. The texture unit of claim 17, wherein each of the two bilinear texture samples is positioned on the major axis of anisotropy at an offset distance from the center of the major axis of anisotropy, wherein the offset distance is half of a fractional portion of the anisotropic ratio of the footprint defined by the major axis of anisotropy.

19. The texture unit of claim 17, wherein the bilinear weight computation unit is configured to position each of the two bilinear texture samples and the remaining samples to not extend beyond the major axis of anisotropy.

* * * * *

UNITED STATES PATENT AND TRADEMARK OFFICE
CERTIFICATE OF CORRECTION

PATENT NO.       : 7,619,635 B1                          Page 1 of 1
APPLICATION NO.  : 11/225515
DATED            : November 17, 2009
INVENTOR(S)      : Michael J. M. Toksvig It is certified that error appears in the above-identified patent and that said Letters Patent is hereby corrected as shown below:

In column 15, line 32, please replace "axis of an isotropy." with -- axis of anisotropy. --.

Signed and Sealed this

Second Day of March, 2010

David J. Kappos
*Director of the United States Patent and Trademark Office*